(12) United States Patent
Tsukagoshi et al.

(10) Patent No.: US 7,165,587 B2
(45) Date of Patent: Jan. 23, 2007

(54) TORIC REINFORCED AIR BAG FOR SAFETY TIRE AND METHOD OF PRODUCING THE SAME AS WELL AS METHOD OF PRODUCING SHAPED BODY FOR REINFORCING LAYER

(75) Inventors: Tetsuito Tsukagoshi, Kodaira (JP); Osamu Saito, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 174 days.

(21) Appl. No.: 10/478,990

(22) PCT Filed: May 29, 2002

(86) PCT No.: PCT/JP02/05217

§ 371 (c)(1),
(2), (4) Date: Nov. 26, 2003

(87) PCT Pub. No.: WO02/096678

PCT Pub. Date: Dec. 5, 2002

(65) Prior Publication Data

US 2004/0177909 A1    Sep. 16, 2004

(30) Foreign Application Priority Data

May 29, 2001  (JP)  .............................. 2001-159814
Feb. 14, 2002 (JP)  .............................. 2002-037190
Feb. 14, 2002 (JP)  .............................. 2002-037191

(51) Int. Cl.
*B60C 17/01* (2006.01)
*B60C 17/02* (2006.01)
*B60C 5/08* (2006.01)
*B60C 5/22* (2006.01)

(52) U.S. Cl. ................... 152/512; 152/458; 152/339.1; 152/518; 152/519

(58) Field of Classification Search ................ 152/192, 152/195, 458, 512, 518, 519, 339.1–342.1
See application file for complete search history.

(56) References Cited

U.S. PATENT DOCUMENTS 584,289 A * 6/1897 Morgan .................. 152/512 X
1,144,239 A * 6/1915 Poole ......................... 152/512

(Continued)

FOREIGN PATENT DOCUMENTS

DE         25 53 449 A  *  6/1977

(Continued)

*Primary Examiner*—Adrienne C. Johnstone
(74) *Attorney, Agent, or Firm*—Sughrue Mion, PLLC

(57) ABSTRACT

The invention proposes a technique of preventing a propagation of a damage in a reinforcing layer to a toric air bag even if the reinforcing layer arranged on an outer peripheral side of the toric air bag in a safety tire to suppress an unnecessary size growth of the toric air bag and allowed to a proper expansion deformation of the toric air bag in the puncture of the tire or the like is damaged by foreign matters entered through a puncture hole into the tire, in which the reinforcing layer separately arranged from the toric air bag is fitted on the outer peripheral side of the toric air bag having a hollow torus shape over its full periphery to suppress the propagation of the damage in the reinforcing layer to the toric air bag through an interface layer therebetween.

3 Claims, 11 Drawing Sheets

U.S. PATENT DOCUMENTS

| | | | | |
|---|---|---|---|---|
| 2,244,941 A | * | 6/1941 | Degnen | 152/341.1 |
| 2,510,974 A | * | 6/1950 | Hainlen | 152/342.1 |
| 2,987,093 A | | 6/1961 | Urbon | |
| 3,724,521 A | | 4/1973 | Coddington et al. | |
| 3,802,982 A | * | 4/1974 | Alderfer | 156/906 X |
| 3,885,614 A | | 5/1975 | Fujikawa et al. | |
| 3,993,114 A | * | 11/1976 | Hinderks | 152/340.1 |
| 4,008,743 A | | 2/1977 | Welch | |
| 4,137,894 A | | 2/1979 | Gardner et al. | |
| 4,164,250 A | * | 8/1979 | Shichman | 152/519 X |
| 4,963,207 A | | 10/1990 | Laurent | |
| 2003/0178116 A1 | * | 9/2003 | Yamaguchi et al. | 152/340.1 |
| 2004/0154719 A1 | * | 8/2004 | Zuigyou | 152/340.1 |

FOREIGN PATENT DOCUMENTS

| | | | | |
|---|---|---|---|---|
| DE | 39 42 997 A1 | | | 7/1990 |
| EP | 0 928 702 A1 | | | 7/1999 |
| GB | 987 983 A | | | 3/1965 |
| GB | 2000087 A | | | 1/1979 |
| GB | 2 074 955 A | | | 11/1981 |
| JP | 50-38779 A | | | 4/1975 |
| JP | 5-104916 A | | | 4/1993 |
| JP | 2002059718 A | * | | 2/2002 |
| JP | 2002059719 A | * | | 2/2002 |
| JP | 2002067631 A | * | | 3/2002 |
| JP | 2002067632 A | * | | 3/2002 |
| JP | 2002120526 A | * | | 4/2002 |
| JP | 2002144444 A | * | | 5/2002 |

\* cited by examiner

Crown portion
Side portion
Support
Base portion

Support

TORIC REINFORCED AIR BAG FOR SAFETY TIRE AND METHOD OF PRODUCING THE SAME AS WELL AS METHOD OF PRODUCING SHAPED BODY FOR REINFORCING LAYER

TECHNICAL FIELD

This invention relates to a toric reinforced air bag for a safety tire which is used in a safety tire, particularly a safety tire for heavy duty vehicles capable of continuing a safe running over a given distance even if an internal tire pressure drops or disappears due to puncture of the tire or the like and which is expansion-deformed based on the drop of the internal tire pressure to subrogate a load support from the tire, and a method of producing the same as well as a method of producing a shaped body for a reinforcing layer used therein.

BACKGROUND ART

Heretofore, there have been proposed various tires as a safety tire capable of continuously and safely running to a place provided with an equipment for exchanging or repairing the tire even if the internal tire pressure drops or disappears due to the puncture of the tire, damage of an air valve and the like.

As an example of them, there is a tubeless pneumatic tire as shown at a cross section in FIG. 1, in which a hollow, toric air bag 102 made of a soft rubber likewise a tire tube is put in an interior of the tire 101 and a reinforcing layer 103 is arranged on an outer peripheral side of a crown portion of the air bag 102 over a full periphery thereof. Such a safety tire is used by assembling the pneumatic tire 101 onto a standard rim 104 and filling a given air pressure into an interior of the tire through a valve 105 and further filling an air pressure higher than the internal tire pressure into an interior of the air bag 102 through another valve 106.

The term "standard rim" used herein means a rim specified according to a standard of JATMA YEAR BOOK 2000, ETRTO STANDARD MANUAL 2000, TRA (THE TIRE and RIM ASSOCIATION INC.) YEAR BOOK 2000 or the like. As represented by JATMA YEAR BOOK, the standard rim is an approved rim described in its General Information.

In case of running the safety tire under loading in the presence of the given air pressure inside the tire 101, the robbing of the air bag 102 with an inner peripheral face of a tread portion in a ground contact region of a tread can be effectively prevented by the action of the reinforcing layer 103 acting as a member for suppressing a size growth of the air bag 102.

On the other hand, if a pressure difference between an inside and an outside of the air bag 102 exceeds a given value due to the drop, disappear or the like of the internal tire pressure, the air bag 102 is expansion-deformed under an extension deformation of the reinforcing layer 103 to approximately uniformly adhere to the inner face of the tire 101 over its full peripheral and hence the air bag 102 acts as in the conventional tire tube to subrogate a load support from the tire 101 while controlling deflection deformation of the tire to a small extent, whereby a continuous and safe running can be realized in the puncture of the tire or the like.

In the above proposed technique, when the toric reinforced air bag is constructed by integrally vulcanization-joining the reinforcing layer 103 on the outer peripheral side of the air bag 102, if stone or other foreign matter entered, for example, from a punctured hole of the tire into the interior of the tire sticks in, butts onto or rubs with the reinforcing layer 103 to create cracks in the reinforcing layer 103, there is a problem that a fear of prematurely propagating such cracks to the air bag 102 integrally united with the reinforcing layer 103 is high.

Also, in order to produce the toric reinforced air bag by integrally uniting the reinforcing layer 103 with the air bag 102 through vulcanization, it is necessary that a starting material for the reinforcing layer is applied onto an outer peripheral face of an uncured air bag having an unstable shape over a given region while suppressing an expansion shape of the uncured air bag as is expected, if necessary, and both the materials are joined through vulcanization, so that there is finally caused a problem that it is difficult to accurately arrange the reinforcing layer 103 on a given position of the air bag 102.

The invention is made for solving the above problems of the conventional techniques and is to provide a toric reinforced air bag for a safety tire capable of effectively preventing the propagation of cracks to the air bag even if the cracks or the like are created in the reinforcing layer and a method of producing a toric reinforced air bag for a safety tire in which a reinforcing layer can be accurately produced in desired shape, size and the like and also such a reinforcing layer can be simply and easily fitted onto a desired position of a toric air bag.

DISCLOSURE OF THE INVENTION

The toric reinforced air bag for safety tires according to the invention is placed inside a tire and inflated under a certain internal pressure, and expansion-deformed accompanied with the drop of the internal tire pressure to subrogate a load support from the tire, in which a crown portion of a toric air bag having a hollow torus shape as a whole is fitted on its outer peripheral side over a full periphery thereof with a reinforcing layer distinct from the air bag.

The reinforcing layer may be made of a composite material of rubber and fibrous members such as wavy cords, organic fiber cords, non-woven fabric or the like.

When such a toric reinforced air bag is used in a safety tire likewise the above-mentioned case, the robbing of the toric air bag with an inner peripheral face of a tread portion at a normal state of the tire can be effectively suppressed by the function of the reinforcing layer controlling the size growth, while if the internal tire pressure is disappeared by the puncture of the tire or other troubles, the toric air bag can subrogate a load support from the tire under an expansion deformation of the toric air bag based on the extension deformation of the reinforcing layer. Moreover, a nitrogen gas or other inert gas may be filled in each of the tire and the toric air bag instead of air.

Even if cracks are created in the reinforcing layer by sticking a foreign matter entered from the punctured hole into the interior of the tire or the like, since the reinforcing layer and the toric air bag are separated from each other at a time of creating the crack in the reinforcing layer, the propagation of the crack from the reinforcing layer to the toric air bag can be effectively suppressed.

However, when the tire is assembled onto a rim at a state of separating the toric air bag and the reinforcing layer from each other, the displacement between the toric air bag and the reinforcing layer is caused and the reinforcing layer can not protect the toric air bag from the foreign matter and also there is a fear that the operability in the assembling onto the rim is deteriorated. It is at least required that the toric air bag and the reinforcing layer are closed to each other in the assembling, while the toric air bag and the reinforcing layer are separated from each other at the time of creating the crack in the reinforcing layer. For this end, it is preferable that the toric air bag and the reinforcing layer are joined at a weak adhesion strength in the assembling thereof.

If the toric air bag and the reinforcing layer are joined at a strong adhesion strength in the assembling thereof, the displacement therebetween can be prevented, but when the crack is created in the reinforcing layer, they can not be separated from each other and are at an integrally united state and hence the crack is propagated to the toric air bag.

On the other hand, when the toric air bag and the reinforcing layer are joined at the weak adhesion strength in the assembling onto the rim, they are at a state of easily separating from each other after the assembling onto the rim and hence the propagation of the crack to the toric air bag can be prevented even if the crack is created in the reinforcing layer. That is, even if the toric air bag and the reinforcing layer are at a joined state after the assembling onto the rim, since the adhesion strength is weak, the propagation of the crack from the reinforcing layer to the toric air bag can be prevented.

The term "adhesion strength" used herein means a result obtained according to a peeling test defined in JIS K6301. In this case, a measuring temperature is 20° C.

The adhesion strength is preferably not more than 4 kN/m, more preferably 0.5–2.0 kN/m.

In other words, when the adhesion strength exceeds 4 kN/m, the joined state between the toric air bag and the reinforcing layer is too nearest to the integrally united state through vulcanization joining, so that it is difficult to surely prevent the propagation of the crack from the reinforcing layer to the toric air bag.

Moreover, when the adhesion strength is less than 0.5 kN/m, there are feared the displacement between the toric air bag and the reinforcing layer, the entrance of the foreign matter therebetween and the like, and also there is a fear of deteriorating the operability in the assembling onto the rim and the dissembling therefrom.

More preferably, the reinforcing layer has a seamless structure on its periphery. According to this structure, more uniform extension deformation over the full periphery of the reinforcing layer is ensured as compared with a case that the starting materials for the reinforcing layer are lap-joined at one or more places on the periphery to form a joint portions(s) in the reinforcing layer, whereby the toric air bag can be sufficiently uniformly expanded over the full periphery at a time of puncturing the tire.

Also, it is preferable that the reinforcing layer is fitted onto the toric air bag over a range of not less than ⅓ of a periphery length at a cross section thereof. That is, if the fitting range of the reinforcing layer is too narrow, there is a fear that the foreign matter entered into the tire directly sticks into the toric air bag or rubs therewith. When the fitting range of the reinforcing layer is less than ⅓ of the periphery length, the toric air bag is highly feared to partially expand toward one side at its cross section in the expansion deformation of the toric air bag and hence the deterioration of the durability can not be avoided due to the fact that the toric air bag is not uniformly expansion-deformed at its cross section.

In the production method of the toric reinforced air bag according to the invention, the reinforcing layer is particularly post-built on the outer peripheral side of the crown portion of the toric air bag having a hollow torus shape as a whole over a full periphery thereof at a cured state of at least one of the toric air bag and the reinforcing layer.

According to this method, the strong vulcanization joining between the toric air bag and the reinforcing layer can be advantageously prevented irrespectively of the necessity of vulcanization after the building of the reinforcing layer, so that the propagation of the crack to the toric air bag in the toric reinforced air bag can be sufficiently prevented.

Moreover, when the uncured toric air bag is subjected to vulcanization prior to the building of the cured or uncured reinforcing layer, the toric reinforced air bag can be produced in a higher accuracy because the reinforcing layer can be simply and accurately built onto a given position of the toric air bag as is expected irrespective of the vulcanization of the reinforcing layer itself.

This is true in case that the uncured reinforcing layer is built onto the cured toric air bag and then such a reinforcing layer is subjected to vulcanization. In addition, the reinforcing layer can be relatively weakly joined to the cured toric air bag accompanied with the vulcanization of the reinforcing layer, so that the propagation of the crack from the reinforcing layer to the toric air bag or the like can be sufficiently prevented but also the penetration of the foreign matter entered into the tire between the toric air bag and the reinforcing layer can be effectively blocked.

Preferably, the uncured reinforcing layer having flange-shaped flared portions in its both sides is applied onto the outer peripheral side of the cured toric air bag and then the reinforcing layer is subjected to vulcanization at a state of applying the flared portions of the reinforcing layer onto inner peripheral portions of the toric air bag. According to this method, in addition to the above advantages based on the vulcanization of the reinforcing layer after the building onto the cured toric air bag, a chance of contacting the foreign matter entered into the tire with the toric air bag can more advantageously reduced because the inner peripheral side portions of the toric air bag are covered with the flange-shaped flared portions of the uncured reinforcing layer.

The uncured reinforcing layer can be formed by building a composite material of fibrous member and rubber onto a peripheral face of a hard support having a required outer profile form.

According to this method, the reinforcing layer having a high dimension accuracy can be simply and rapidly produced by forming the uncured reinforcing layer on the shape-stable hard support without being affected by the toric air bag. Therefore, this reinforcing layer can be always properly fitted onto the required position of the toric air bag irrespectively of the vulcanization of the reinforcing layer and hence the toric reinforced air bag can be realized in a high accuracy.

Also, the reinforcing layer is constructed with the composite material of fibrous member and rubber, so that the required elongation ratio-tensile strength characteristic and other properties can easily be given to the cured reinforcing layer under proper selection of form, density and material of the fibrous member, winding number thereof, rubber properties and so on.

In this case, a narrow-width strip of the composite material is extended substantially in a peripheral direction of the hard support and spirally wound in a widthwise direction of the hard support to form an uncured reinforcing layer, whereby the reinforcing layer can be sufficiently uniformized over its full periphery as a seamless structure having no joint portion on the periphery but also the reinforcing layer having a required dimension accuracy can be simply and easily formed while preventing the occurrence of wrinkles or the like on the reinforcing layer based on the winding of the narrow-width strip.

The fibrous member in the composite material may be cords extending straight or wavy in an extending direction of the narrow-width strip or a non-woven fabric. In this case, the function of suppressing the size growth of the toric air bag can be sufficiently developed while ensuring a high rigidity of the reinforcing layer, and also the toric air bag can be equally closed to the inner face of the tire by uniformizing the expansion deformation of the toric air bag in case of causing a given pressure difference. In addition, the formation of the narrow-width strip is easy, and also the desired rigidity distribution can be easily given to the reinforcing layer.

And also, when the narrow-width strip having a width of 10–70 mm is built onto the hard support to form the uncured reinforcing layer, a high forming operation efficiency can be realized while sufficiently ensuring the building accuracy and operability of the strip.

It is preferable that the narrow-width strip is built onto the hard support at an angle of 0–30° with respect to a peripheral direction thereof from viewpoints that the strip is properly applied onto the hard support without causing wrinkles and that the rigidity distribution of the reinforcing layer in the peripheral direction thereof is uniformly ensured.

That is, when the angle exceeds 30°, the wrinkles are created in the strip and also it is feared that non-uniform rigidity distribution of the reinforcing layer, bending of the reinforcing layer itself and the like are caused.

In the winding of the narrow-width strip, at least widthwise parts of the wound strips may be overlapped with each other. In this case, relative rigidity of the reinforcing layer in the widthwise direction and the like can be easily adjusted, if necessary, by changing an overlap amount of the narrow-width strip in the widthwise direction of the hard support.

On the other hand, it is possible to wind the narrow-width strip while contacting side faces of the strips with each other.

The uncured reinforcing layer can be formed by building the narrow-width strips onto the hard support so as to extend the strip substantially in the widthwise direction thereof with no space. In this case, the occurrence of wrinkles can be more advantageously suppressed to realize an effective reduction of inferior quality while keeping advantages based on the formation of the reinforcing layer on the hard support.

In the formation of the reinforcing layer as mentioned above, it is possible to form plural constructional parts for the reinforcing layer on one or more arc-shaped segment supports. In this case, it is possible to miniaturize the shaping equipment. On the other hand, when the shaping is carried out by annually and endlessly building the narrow-width strips on an ring-shaped hard support over its full periphery in a given order, there are some merits in view of the operating number and quality because it is useless to post-join the plural constructional parts for the reinforcing layer shaped on the segment supports to each other.

Such a formation of the reinforcing layer can be carried out by returning a continuous narrow-width strip at each side end of a hard support to build zigzag thereonto, or by building many short-length narrow-width strips on a hard support so as to straightforward extend the strip from one side edge of the support to the other side edge thereof.

The method of producing the shaped body for the reinforcing layer in the toric reinforced air bag for the safety tire according to the invention lies in that in case of producing a reinforcing member serving as a reinforcement for the toric reinforced air bag placed in the tire and inflated under the internal pressure and expansion-deformed accompanied with the drop of the internal tire pressure to subrogate a load support from the tire, the narrow-width strip made of the composite body of fibrous members and rubber is extended on an outer surface of a hard support having a desired cross-sectional outer profile form substantially in the peripheral direction thereof and spirally wound and built thereon in the widthwise direction to form a shaped body for the reinforcing layer.

According to this method, the narrow-width strip of the composite body is built onto the outer surface of the shape-stable hard support to form a shaped body for a reinforcing layer as an uncured reinforcing layer. Therefore, the strip can be always and properly built onto the support without the occurrence of wrinkles or the like as is expected to simply and easily form the shaped body for the reinforcing layer having the required shape and size.

The thus shaped body for the reinforcing layer is placed in a vulcanization mold together with the hard support and vulcanized to form a product of the reinforcing layer. This reinforcing layer is fitted onto a given position of a cured toric air bag, which constitutes a toric reinforced air bag under an adhesion therebetween or without the adhesion.

In this case, the fibrous member in the composite body may be cords extending straight or wavy in an extending direction of the narrow-width strip, or non-woven fabric. Also, the narrow-width strip of the composite body is preferable to have a width of 10–70 mm in order to realize an excellent operation efficiency while sufficiently ensuring the building accuracy and building operability of the strip.

Moreover, it is preferable that an inclination angle of the narrow-width strip with respect to the peripheral direction of the hard support is within a range of 0–30° from viewpoints that the strip is properly built onto the hard support without causing wrinkles and that the rigidity distribution of the shaped body of the reinforcing layer in the peripheral direction thereof is uniformly ensured.

When the narrow-width strip is wound so as to overlap at least width-wise parts of the wound strips with each other, the rigidity, tension resistance and the like of the toric reinforced air bag can be properly adjusted by the selection of the overlap amount. When the overlap amount is changed in accordance with widthwise positions of the hard support, the rigidity and the like of each part of the shaped body for the reinforcing layer can be relatively adjusted.

Moreover, the narrow-width strip can be wound while contacting side faces of the strips with each other with no space between the wound strips, whereby the forming operation efficiency in the shaped body for the reinforcing layer can be advantageously improved while making the rigidity and the like of the shaped body for the reinforcing layer substantially constant over a whole of a cross section thereof.

Another method of producing the shaped body for the reinforcing layer in the toric reinforced air bag according to the invention lies in that narrow-width strips made of the composite body of fibrous members and rubber are applied onto the outer surface of the hard support having a desired cross-sectional outer profile form so as to extend substantially in the width-wise direction of the hard support with no space between the strips to form a shaped body for a reinforcing layer.

According to this method, the narrow-width strip of the composite body is applied onto the outer surface of the shape-stable hard support to form a shaped body for a reinforcing layer as an uncured reinforcing layer, whereby the strip can be always and properly applied onto the support without the occurrence of wrinkles or the like as is expected to simply and easily form the shaped body for the reinforcing layer having the required shape and size.

The thus shaped body for the reinforcing layer is placed in a vulcanization mold together with the hard support, or placed in the vulcanization mold at a state of fitting onto a given position of a separately formed and toric air bag, and then vulcanized to form a product of the reinforcing layer. In the former case, the reinforcing layer product is fitted onto a given position of the cured toric air bag, which constitutes a reinforced toric air bag under an adhesion therebetween or without adhesion. In the latter case, a toric reinforced air bag is constituted at a weak adhesion state of the reinforcing layer to the toric air bag.

The formation of the shaped body for the reinforcing layer is possible to be carried out on one or more arc-shaped segment supports. In this case, it is possible to miniaturize the forming equipment. Also, when such a formation is carried out by annually and endlessly applying the narrow-width strips on an ring-shaped hard support over its full periphery in a given order, there are some merits in view of the operating number and quality because it is useless to post-join the plural constructional parts for the reinforcing layer shaped on the segment supports to each other.

In this case, the fibrous member in the composite body may be cords extending straight or wavy in an extending direction of the narrow-width strip, or non-woven fabric, and also the narrow-width strip of the composite body is preferable to have a width of 10–70 mm in order to realize an excellent operation efficiency while sufficiently ensuring the building accuracy and building operability of the strip.

Further, the formation of the shaped body for the reinforcing layer can be carried out by building a continuous narrow-width strip onto a hard support while returning it at each side end of the hard support, or by building many short-length narrow-width strips onto a hard support so as to extend the strip from one side edge of the support to the other side edge thereof in a desired direction in a desired order.

BEST MODE FOR CARRYING OUT THE INVENTION

Figure 2:
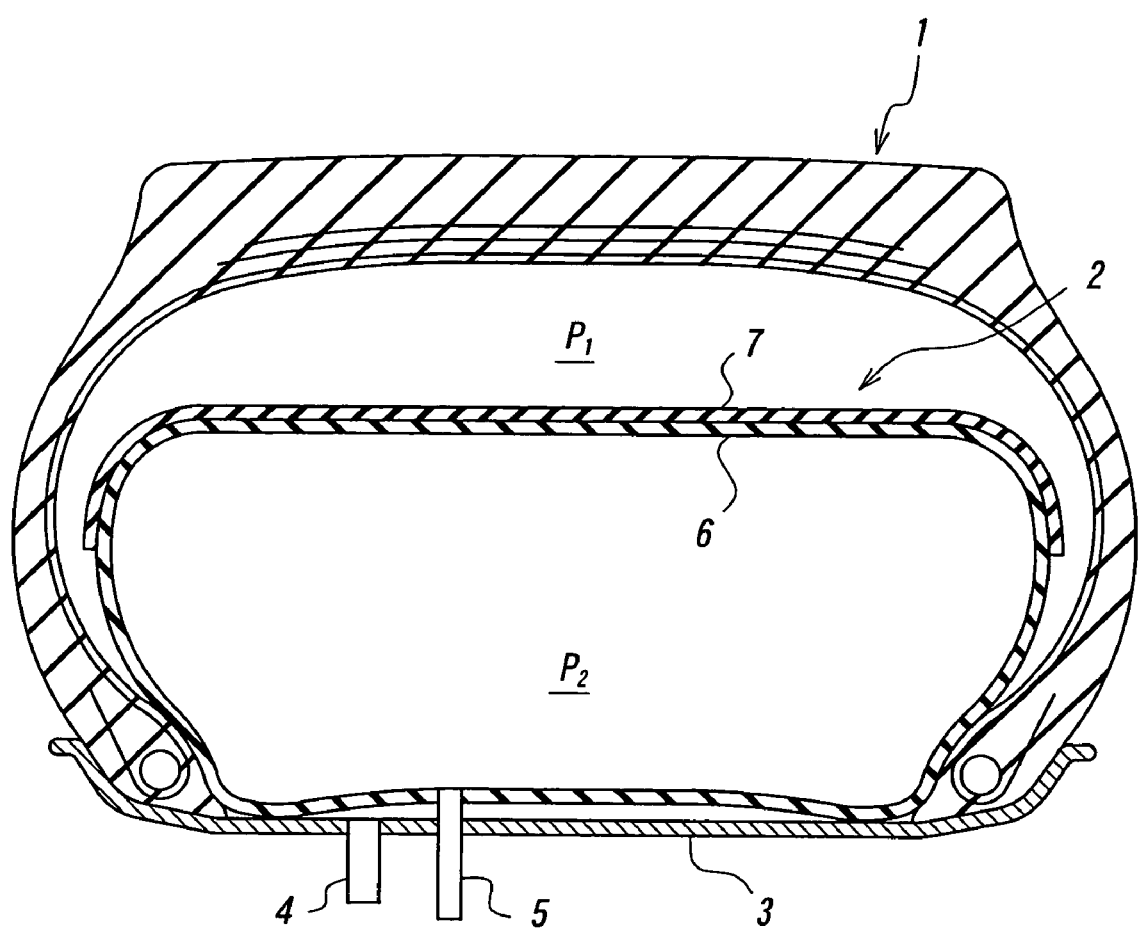
FIG. 2 is a widthwise section view of an embodiment of the safety tire according to the invention.

FIG. 2 is a cross section view of a safety tire incorporated with a toric reinforced air bag according to the invention, which shows a state that the toric reinforced air bag is placed in a tire assembled onto a standard rim and a given air pressure $P_1$ (gauge pressure), for example, a maximum air pressure described in the aforementioned JATMA YEAR BOOK is filled in an interior of the tire and an air pressure $P_2$ higher by 20 kPa or more than the air pressure $P_1$ is filled in an interior of the toric reinforced air bag.

In this figure, numeral 1 is a tubeless pneumatic tire, numeral 2 a toric reinforced air bag placed in the tire, numeral 3 a standard rim assembled with the tire 1, and numerals 4 and 5 valves for filling air into the tire 1 and the reinforced toric air bag 2, respectively.

The illustrated toric reinforced air bag 2 is constructed by fitting a reinforcing layer 7 separated from a toric air bag and having preferably a seamless structure in a peripheral direction onto an outer peripheral side of a crown portion of a toric air bag 6 having a hollow torus shape as a whole over a full periphery thereof. In this case, both the air bag and the reinforcing layer may be at a completely non-joint state or may be joined at a low strength with or without an adhesive.

When the reinforcing layer 7 is joined to the toric air bag 6, it is preferable that the adhesion strength therebetween, i.e. adhesion strength according to a peeling test defined in JIS K6301 is not more than 4 kN/m, preferably 0.5–2 kN/m.

In this case, the position displacement between the toric air bag and the reinforcing layer is prevented on and after the production of the toric reinforced air bag but also the propagation of crack in the reinforcing layer to the toric air bag is prevented as previously mentioned, while the invasion of the foreign matter between the toric air bag 6 and the reinforcing layer 7 can be more advantageously prevented.

The reinforcing layer 7 in the toric reinforced air bag 2 is preferable to have an elongation amount in peripheral direction of not less than 15% in the subrogation of load support by, for example, the toric reinforced air bag 2 for suppressing a crushed deformation amount of the tire 1 in its troubles. In this case, the elongation deformation may be a range of elastic region of the reinforcing layer 7 or a range from elastic region to plastic region thereof.

For instance, when the reinforcing layer 7 is made of a composite material formed by covering straight extending organic fiber cords with a, rubber composition, the elongation deformation is frequently done in an elastic region of the organic fiber cord. Also, when the reinforcing layer is made of a composite material formed by covering wavy cords with a rubber composition, the elongation deformation is done in an elastic region causing disappear of wave form of the cord. On the other hand, when the reinforcing layer 7 is made of a composite material of non-woven fabric and rubber composition, the elongation deformation is usually done in a plastic region disengaging the intertwisting of fibers in the non-woven fabric.

As the fiber of the non-woven fabric used in the reinforcing layer 7, use may be made of natural polymer fibers such as cotton, cellulose and the like; synthetic polymer fibers such as aromatic polyamide fiber, aliphatic polyamide fiber, polyester fiber, polyvinyl alcohol fiber, rayon fiber, polyolefin ketone fiber, polybenzoxazole fiber and the like; and inorganic fibers such as glass fiber, carbon fiber, steel filament and the like. As the aromatic polyamide fiber, mention may be made of polyparaphenylene terephthalamide, polymethaphenylene terephthalamide, polyparaphenylene isophthalamide, polymethaphenylene isophthalamide and the like. These fibers may be used alone or in a combination of two or more.

These fibers may have any cross sectional shapes such as circle, ellipse, polygon and so on, and fibers having a hollow portion therein may be used. Further, there may be used composite fibers of a core-sheath structure, -type shape, petal type shape, lamellar shape or the like in which different materials are applied to inner and outer layers, respectively. If these fibers are sufficiently adhered to a matrix rubber in the composite after the vulcanization, it is not required that such a fiber is previously subjected to an adhesion treatment. However, if the adhesion is not sufficient, the fiber is subjected to the adhesion treatment.

As a method of producing the non-woven fabric are suitable a needle punching method, a carding method, a melt blowing method, and a spun bonding method. Among these methods, the carding method of entangling fibers through water stream or needles and the spun bonding method of joining fibers to each other are more suitable for the non-woven fabric to be produced.

In the rubber composition applied to the non-woven fabric, rubber component is not particularly limited, but diene rubbers such as natural rubber, butadiene rubber, styrene-butadiene rubber, isoprene rubber and the like are preferable. Also, the rubber composition is preferable to have a tensile stress at 50% elongation $M_{50}$ of 2.0–9.0 MPa and a tensile stress at 100% elongation $M_{100}$ of 4.0–15.0 MPa.

Moreover, it is preferable that a weight of the non-woven fabric in the rubber composition is within a range of 10–300 $g/m^2$. When the weight of the non-woven fabric is less than 10 $g/m^2$, it is difficult to maintain the uniformity of the non-woven fabric and the unevenness of fiber distribution becomes large and hence the scattering in the strength, rigidity and elongation at break of the reinforcing layer 7 made of the composite body of cured rubber composition and non-woven fabric becomes large, while when the weight exceeds 300 $g/m^2$, it is difficult to penetrate the rubber composition into spaces inside the non-woven fabric dependent upon the fluidity of the rubber composition, and hence the uniformity of the reinforcing layer 7 is easily damaged. In any case, the weight outside the above range is unfavorable.

The toric rubbery air bag 6 in the toric reinforced air bag 2 can be produced, for example, as follows.

Figure 3:
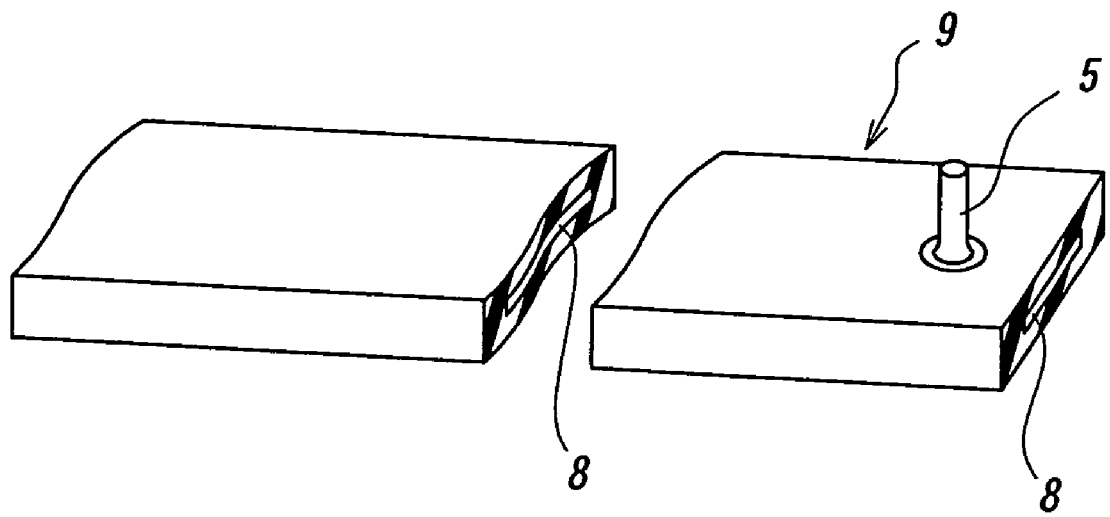
FIG. 3 is a diagrammatic view of a hollow shaped body for producing an uncured toric air bag.
Figure 4:
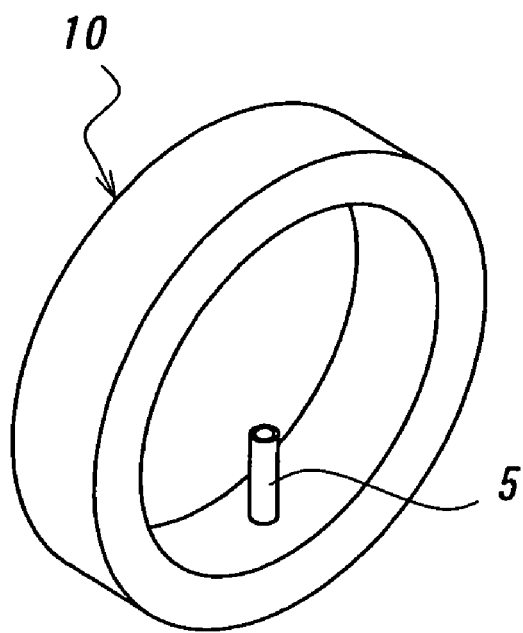
FIG. 4 is a perspective view of a ring-shaped body as an uncured toric air bag.

As shown in FIG. 3, a flat and hollow rubber shaped body 9 having a hollow portion 8 formed by spraying or applying a lubricant or releasing agent such as stearic acid or the like in a central part in its thickness direction is extruded in form of a band and cut into a given length, and a valve 5 capable of supplying or releasing pressure in the hollow portion 8 is attached to the cut shaped body 9. Then, both ends of the cut shaped body 9 are butt-joined in an endless form at a state of locating the valve 5 at an inner peripheral side as shown in FIG. 4 to form a ring-shaped body 10 having a continuous hollow portion 8 therein as an uncured toric air bag.

Thereafter, the ring-shaped body 10 is expanded by supplying an internal pressure such as pressurized air or the like through the valve 5 into the hollow portion 8 and placed in an interior of a vulcanization mold and further expanded in the vulcanization mold so as to close the whole of the ring-shaped body 10 to an inner face of the mold and cured through vulcanization to obtain a toric air bag product.

Figure 5:
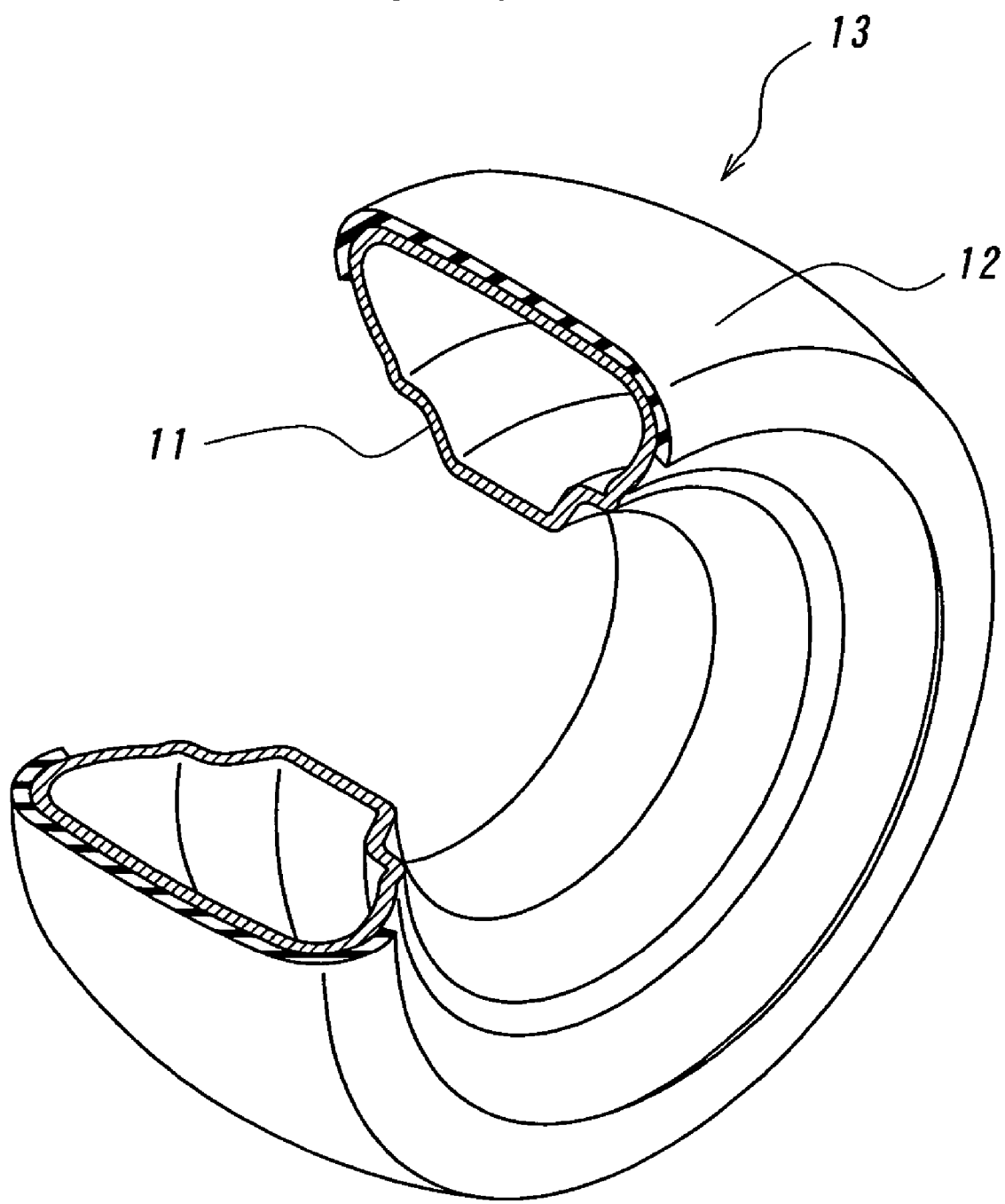
FIG. 5 is a sectionally perspective view illustrating a forming example of a shaped body for a reinforcing layer.

On the other hand, the reinforcing layer 7 is produced as shown in, for example, FIG. 5, in which a starting material 12 for the reinforcing layer made of a composite material of fibrous members and rubber is built onto a peripheral face of a hard support 11 having a peripheral shape corresponding to a required outer peripheral face shape of the toric air bag 6 over, for example, its full periphery with no space under an ability of the support 11 supporting a large external force, whereby a shaped body 13 for the reinforcing layer as an uncured reinforcing layer can be simply and rapidly formed over a required region of the hard support 11 in a higher accuracy as is expected.

Thereafter, the shaped body 13 for the reinforcing layer is placed in a vulcanization mold together with the support 11 or without the support and then shaped body 13 is cured through vulcanization, whereby the reinforcing layer 7 can be produced while keeping the high shaping accuracy. This is true in case of producing the reinforcing layer up to a side face region or an inner peripheral region of the support 11.

The thus produced reinforcing layer 7 is fitted onto the outer peripheral face of the toric air bag 6 as shown in FIG. 2, whereby a desired toric reinforced air bag 2 can be formed.

In this case, it is preferable that the reinforcing layer 7 is arranged in the cross section of the toric air bag over a range of not less than ⅓ of a periphery length for expansion-deforming the toric air bag 6 under sufficient equality in the cross section without displacement.

When the toric air bag 6 and the reinforcing layer 7 are separately and independently produced according to the method of the invention, if the reinforcing layer 7 is particularly formed on the shape-stable hard support having a desired shape as previously mentioned, the reinforcing layer 7 can be easily and always formed in a higher accuracy without sufficiently preventing the occurrence of wrinkles or the like irrespectively of the width, thickness and the like and even if it is applied over a zone ranging from the crown portion of the support to the side face portion or inner peripheral portion thereof. Therefore, this method can simply and rapidly cope with the change of design or the like of the toric reinforced air bag 2, directly the reinforcing layer 7.

Although the above is described with respect to the case that the reinforcing layer 7 as a cure product is built onto the toric air bag 6 as a cured product, it is possible that the uncured toric air bag, i.e. ring-shaped body 10 in the figure, or the uncured reinforcing layer, i.e. shaped body 13 for the reinforcing layer in the figure are built onto the cured reinforcing layer 7 or toric air bag 6 and then the uncured constitutional portion is subjected to vulcanization at an integrally united state. In the latter case, the uncured constitutional portion can be joined to the cured constitutional portion at a relatively low joining strength.

When the uncured reinforcing layer is built onto the cured toric air bag, the uncured reinforcing layer can be simply and accurately built onto a given position of the toric air bag as is expected. Therefore, when the uncured reinforcing layer is vulcanized while maintaining the built state, the toric reinforced air bag having a high dimensional accuracy can be produced.

Figure 6:
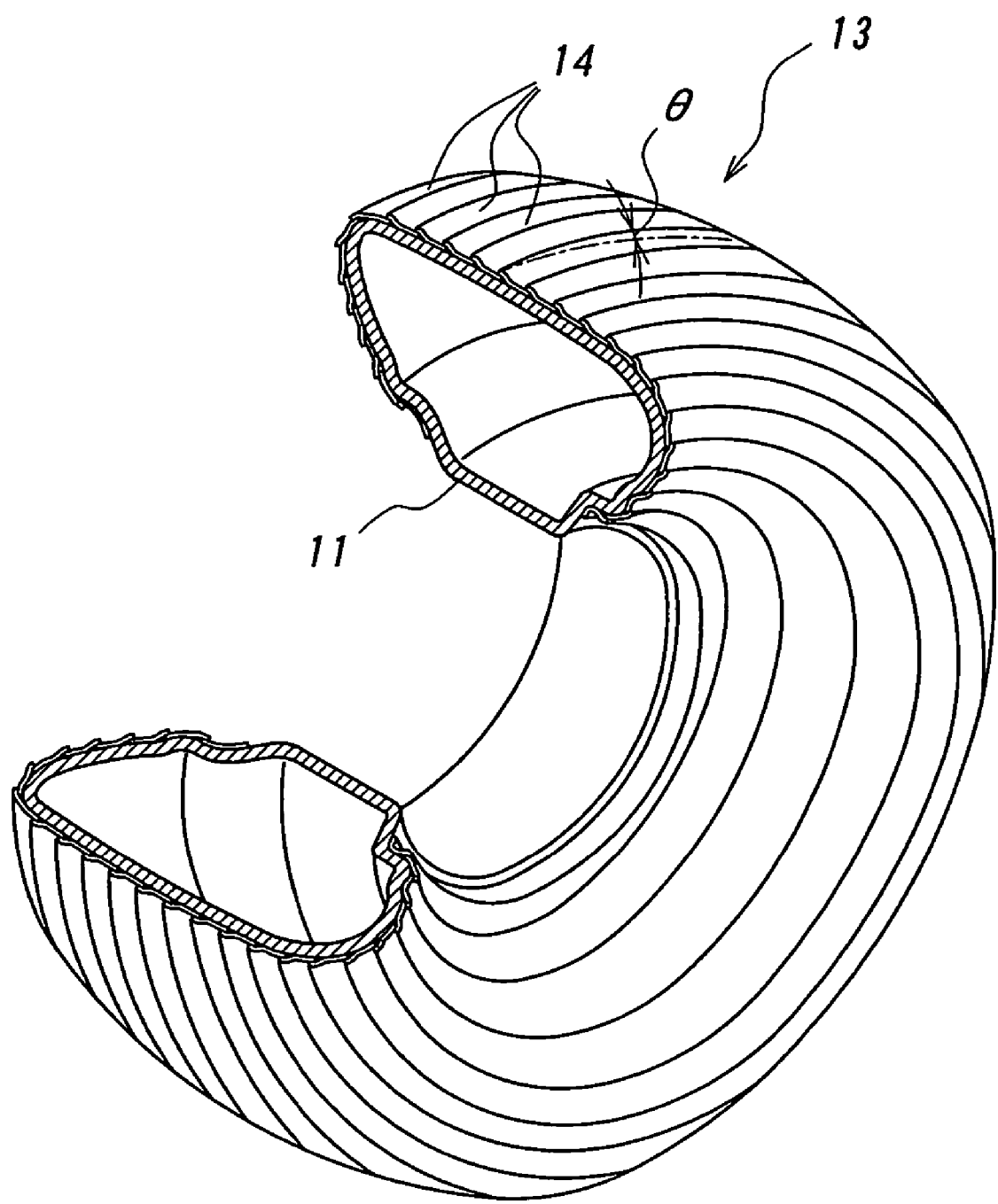
FIG. 6 is a sectionally perspective view illustrating another forming example of a shaped body for a reinforcing layer.

FIG. 6 is a partially cutaway perspective view illustrating a more concrete forming example of a shaped body for the reinforcing layer as an uncured reinforcing layer.

A narrow-width strip made of a composite material of fibrous members and rubber, preferably strip 14 having a constant width of 10–70 mm is extended onto an outer peripheral face of a hard support 11 having a required cross-sectional outer profile form or substantially an annular form as a whole in substantially a peripheral direction of the support 11 and spirally wound in a widthwise direction with no space between the strips so as to extend over a whole of a widthwise required region of the support 11, whereby a shaped body 13 for the reinforcing layer endlessly extending about the support 11 and having a seamless structure on the periphery is formed.

In this case, the fibrous members in the composite material may be organic fiber cords extending straight in the extending direction of the strip 14, organic or metallic fiber cords extending wavy in the extending direction, or a non-woven fabric, preferably non-woven fabric having no directionality of fibers.

As the non-woven fabric can be used the same ones as previously mentioned.

When the constant-width strip 14 made of the composite material of such fibrous members and a rubber composition impregnating, penetrating, coating or the like thereto is extended substantially in the peripheral direction of the ring-shaped hard support 11 and built thereonto to form a shaped body 13 for the reinforcing layer as mentioned above, the shaped body 13 having the required shape and size can be simply and easily formed in a higher accuracy.

In the formation of the shaped body 13 for the reinforcing layer, it is preferable that an angle θ of the strip 14 with respect to the peripheral direction of the support 11 is within a range of 0–30°. Also, the strip 14 can be wound with no space between the strips while overlapping at least widthwise parts of the strips with each other, or while contacting side faces of the strips with each other.

In the former case, the overlap amount between the strips 14 can be properly changed in accordance with widthwise position of the support 11.

The toric reinforced air bag 2 having a high dimensional accuracy can be constructed by vulcanizing the thus formed shaped body 13 for the reinforcing layer in any one of the aforementioned methods.

Figure 7:
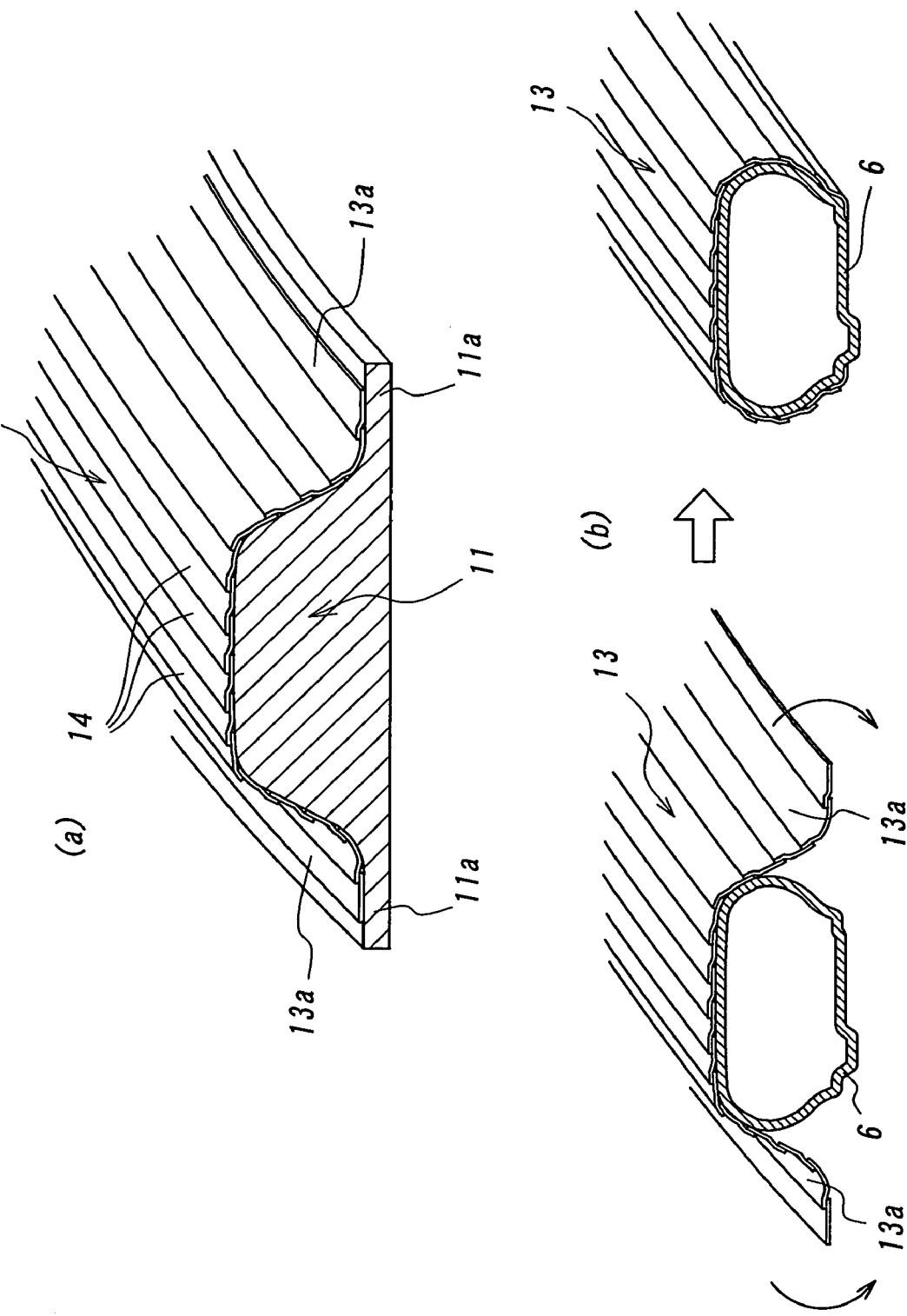
FIG. 7 is a diagrammatic view illustrating the other forming example and an application example of a shaped body for a reinforcing layer.

FIG. 7a is a view illustrating a modification example of the cross-sectional outer profile form in the hard support, in which the ring-shaped hard support 11 is provided on its radially inner end portion with a protruding portion 11a flangedly protruding in the widthwise direction for the purpose of forming a winding margin of the uncured reinforcing layer to be formed toward an inner peripheral side of the toric air bag.

The formation of the shaped body 13 for the reinforcing layer on such a support 11 can be carried out by extending the strip 14 substantially in the peripheral direction and spirally winding it likewise the aforementioned case.

In this case, the shaped body 13 for the reinforcing layer can be formed only by building the strips 14 onto a radially outer face of the support 11, so that the forming operation itself can be facilitated as compared with the case that the strip 14 is built up to a radially inner face side of the support 11 as shown in FIG. 6.

Although the outer profile form of the support 11 shown in FIG. 7a largely differs from that of the toric air bag inflated under an internal pressure, the shaped body 13 for the reinforcing layer formed on such a support is taken out from the support 11 before vulcanization, and then built onto a given region of a crown portion of the cured toric air bag 6 and both flangedly protruding side portions 13a of the shaped body 13 for the reinforcing layer are built up to the inner peripheral portions of the toric air bag 6 as shown in FIG. 7b, and thereafter the shaped body 13 for the reinforcing layer is subjected to vulcanization, whereby a product, i.e. a toric reinforced air bag 2 can be formed.

Figure 12:
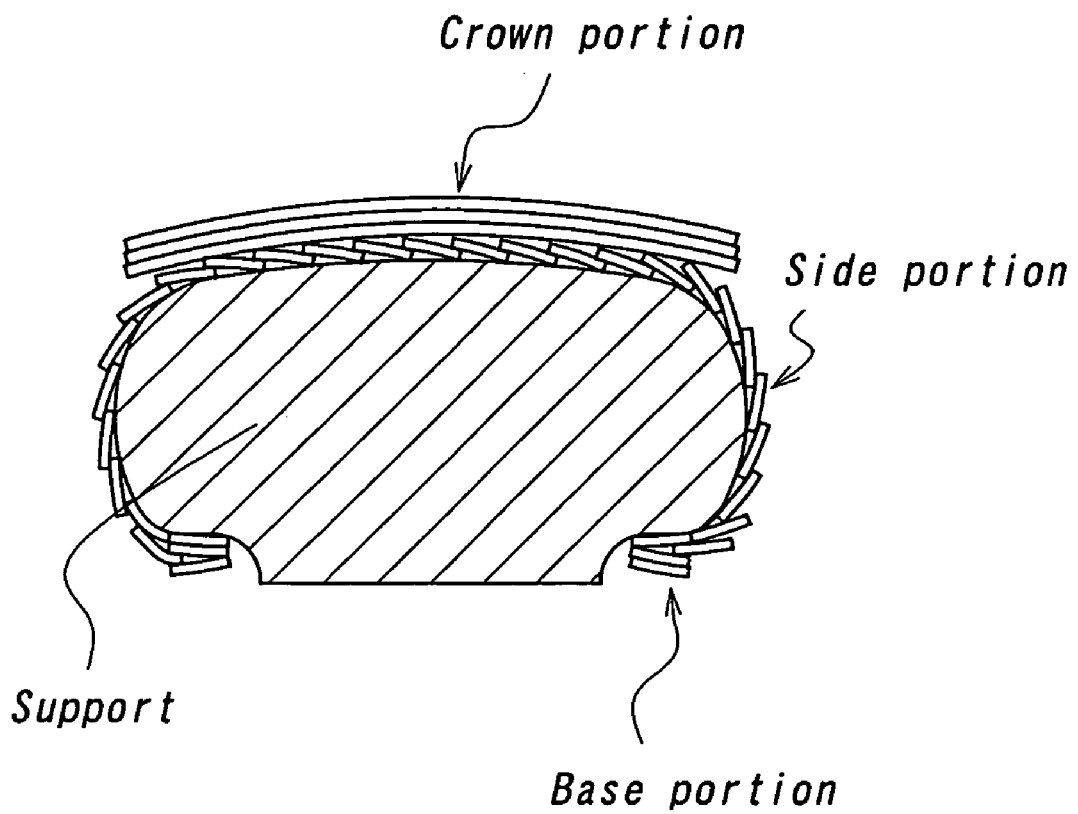
FIG. 12 is a cross section view illustrating a forming example of a shaped body for a reinforcing layer by a method of an example according to the invention.
Figure 13:
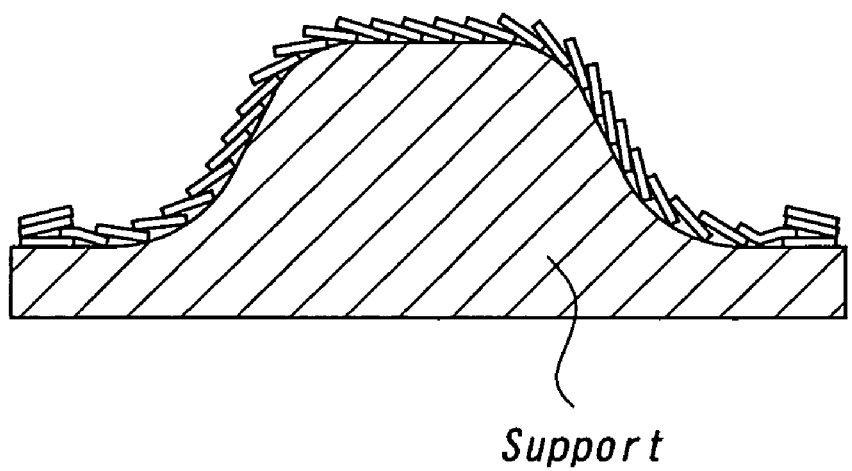
FIG. 13 is a cross section view illustrating another forming example of a shaped body for a reinforcing layer by a method of an example according to the invention.

If a partial reinforcement is further required in the thus formed and cured reinforcing layer 7, it is possible to arrange an additional reinforcing layer made of the same composite material or a composite material having different fibrous members in the formation of, for example, the shaped body 13 for the reinforcing layer as shown in FIGS. 12 and 13. In so far as the additional reinforcing layer is sufficiently and properly arranged on the required region, the winding of the relatively narrow-width strip is not essential, and it is possible to use a wide-width band of the composite material capable of covering the required region by winding.

As mentioned above, the required shaped body 13 for the reinforcing layer can be formed by building the narrow-width strip 14 onto the shape-stable hard support having the required cross-sectional outer profile form. That is, the shaped body 13 having the desired shape and size and capable of surely and adequately arranging on the given position of the toric air bag before or after the vulcanization can be simply and easily produced.

Figure 8:
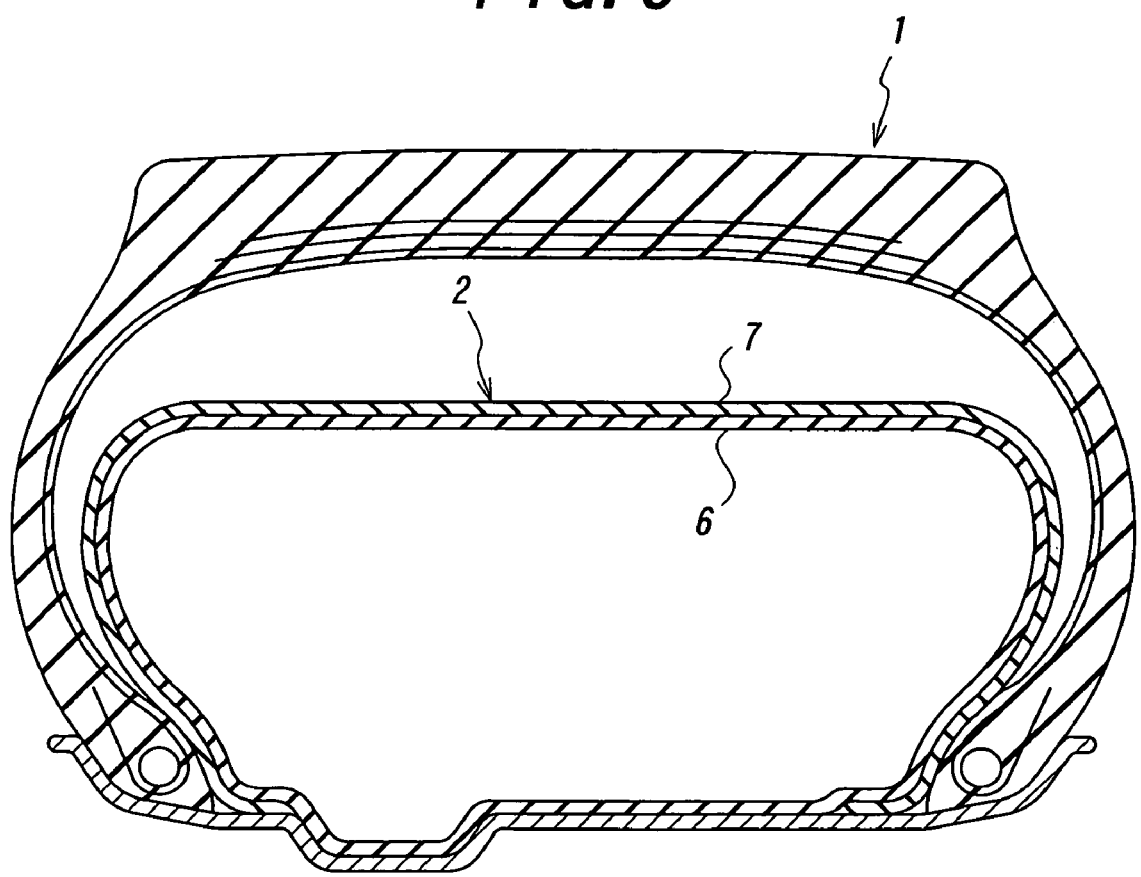
FIG. 8 is a cross section view of a safety tire incorporated with a toric reinforced air bag.

FIG. 8 is a cross section view illustrating a state that the toric reinforced air bag 2 formed by arranging the above shaped and cured reinforcing layer 7 onto the toric air bag 6 is placed in an interior of the tire 1 and after the tire 1 is assembled onto the rim likewise the aforementioned case, each of the tire 1 and the toric reinforced air bag 2 is inflated under a given internal pressure. Thus, the toric air bag 6 can be effectively protected from foreign matters entered into the tire by the reinforcing layer 7 covering the toric air bag 6 up to the inner peripheral face side thereof. Also, since the reinforcing layer 7 has a good shape, a high dimensional accuracy and the like, the expansion deformation of the toric reinforced air bag 2 accompanied with the drop of the internal tire pressure or the like is controlled by the reinforcing layer 7 as is expected, whereby the toric reinforced air bag 2 can be sufficiently equally closed to the inner face of the tire 1 over substantially a whole thereof.

Figure 9:
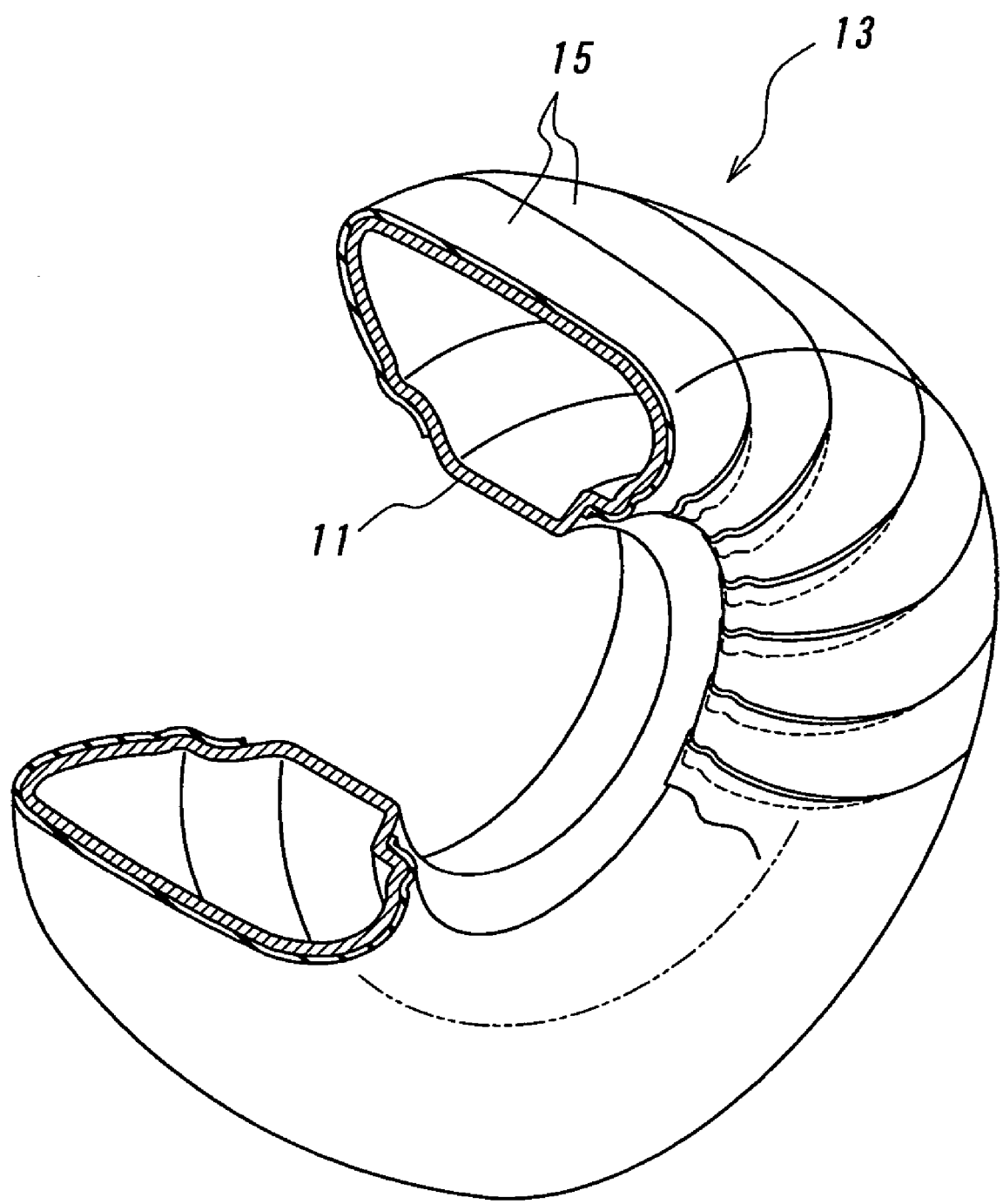
FIG. 9 is a sectionally perspective view illustrating a further forming example of a shaped body for a reinforcing layer.

FIG. 9 is a partially cutaway perspective view of another forming example of the shaped body for the reinforcing layer.

This formation can be carried out by extending a narrow-width and short strip 15 of the same composite material as mentioned above and having preferably a constant width of 10–70 mm on an outer peripheral face of the same hard support 11 as mentioned above in a widthwise direction of the support 11 and building these strips on the required widthwise region of the support 11 in a peripheral direction with no space between the strips, whereby a shaped body 13 for the reinforcing layer endlessly continuing over a full periphery of the support 11 can be formed.

Even in this case, the fibrous member in the composite material may be an organic fiber cord extending straight in a longitudinal direction of the strip 15, an organic or a metallic fiber cord extending wavy, or a non-woven fabric, preferably a non-woven fabric having no directionality of fibers.

In case of forming the shaped body 13 for the reinforcing layer by extending constant-width short strips 15 in the widthwise direction of the ring-shaped hard support 11, the formation of the shaped body 13 can be made simply and easily in a higher accuracy.

In this case, each of the strips 15 is headed inward from the crown portion of the support 11 in the radial direction to increase an overlapped amount between the adjacent strips to thereby gradually enhance the reinforcing strength, so that the required rigidity can be given to a radially inner portion of a product reinforcing layer requiring a high rigidity without increasing the building number of the strips 15.

The toric reinforced air bag 2 having an excellent dimensional accuracy can be also formed by vulcanizing the thus shaped body 13 for the reinforcing layer in any one of the aforementioned methods.

Figure 10:
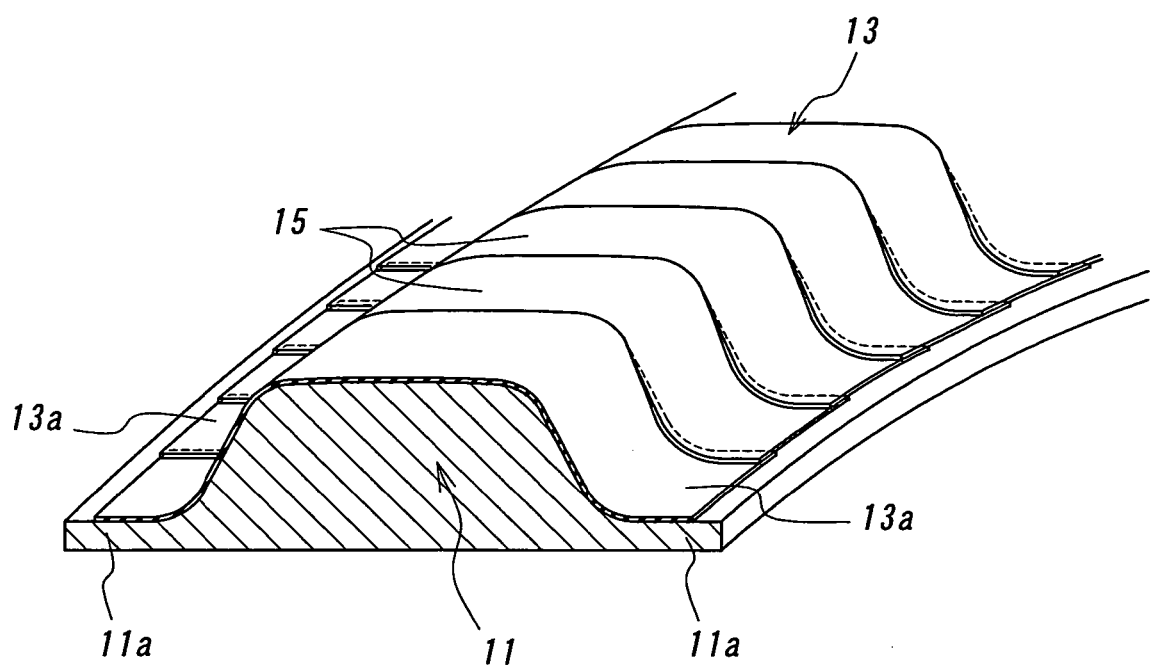
FIG. 10 is a sectionally perspective view illustrating a still further forming example of a shaped body for a reinforcing layer.

FIG. 10 is a perspective view partly shown in section when the shaped body for the reinforcing layer is formed on the same hard support as in FIG. 7a. Even in this case, the forming can be carried out by extending the short strips 15 in the widthwise direction of the support 11 and building them likewise the aforementioned case. The building start and building end of the strips 2 are possible to be alternately opposite to each other or to be aligned.

The shaped body 13 for the reinforcing layer formed on such a support can be built onto the cured toric air bag 6 in the same manner as in FIG. 7b. At such a state, the shaped body 13 for the reinforcing layer is subjected to vulcanization, whereby the toric reinforced air bag 2 is formed so that the cured reinforcing layer 7 is joined to the toric air bag 6 at a low strength.

Figure 11:
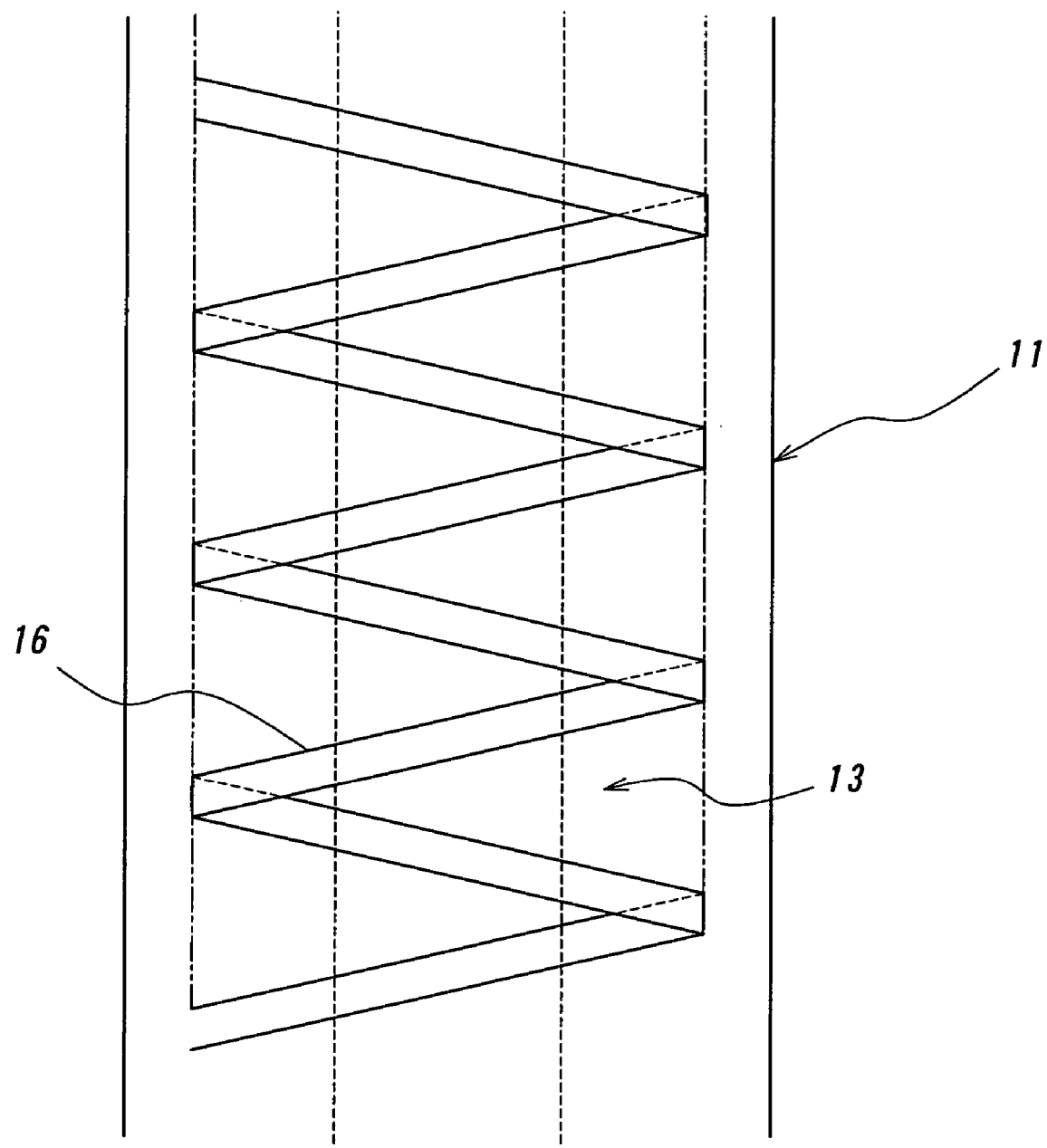
FIG. 11 is a sectionally perspective view illustrating a yet further forming example of a shaped body for a reinforcing layer.

FIG. 11 is a schematically developed plan view illustrating another building embodiment of the narrow-width strip, in which a continuously formed strip 16 having, for example, a uniform width of 10–70 mm is extended substantially in a widthwise direction of the support 11 and turned over the respective side portions of the support 11 to extend zigzag in the peripheral direction as a whole, and such an extending manner is repeated plural times about the ring-shaped support 11 with no space in the peripheral direction to form the shaped body 13 for the reinforcing layer.

According to this embodiment, the shaped body 13 for the reinforcing layer can be formed without cutting the narrow-width strip into many short strips having a given length.

Even when the shaped body 13 for the reinforcing layer is formed by extending the strip substantially in the widthwise direction of the hard support 11, therefore, the shaped body for the reinforcing layer having the desired shape and size and capable of surely and properly fitting onto the given position of the uncured or cured toric air bag can be simply formed by building such a strip onto the shape-stable hard support having the required cross-sectional outer profile form without causing the wrinkles or the like.

The toric reinforced air bag 2 provided with the thus formed and cured reinforcing layer 7 is used in the same manner as in FIG. 8.

EXAMPLES

Example 1

There are provided invention safety tires having a structure shown in FIG. 2 and a tire size of 315/60R22.5 (defined in ETRTO 2000), in which a carcass is comprised of one carcass ply having a radial structure of steel cords, and a reinforcing layer is made of a composite material of a non-woven fabric and a rubber composition, and a toric air bag is made of a soft rubber for a tire tube, and a ratio of the reinforcing layer to a periphery length of the toric air bag and an adhesion strength therebetween are changed, respectively. After each of these tires is assembled onto a standard rim, a running endurance test under conditions that an air pressure filled in the tire is 900 kPa as a gauge pressure and an air pressure filled in the toric reinforced air bag is 950 kPa as a gauge pressure, and a running endurance test under low pressure condition that an internal pressure of the toric reinforced air bag is 450 kPa through its expansion deformation at a puncture state of rendering the internal tire pressure into 0 kPa are carried out to obtain results as shown in Table 1.

The running endurance test is conducted on a drum at a speed of 60 km/h under a load of 34.8 kN to evaluate whether or not the tire can be run over 150,000 km as an indication for commercial endurance, while the running endurance test under low pressure is conducted under the same load and speed conditions as mentioned above to measure a running distance till the occurrence of tire trouble as an evaluation by index. The larger the index value, the better the result.

TABLE 1-1

| | Invention Tires | | | | | | |
|---|---|---|---|---|---|---|---|
| | 1 | 2 | 3 | 4 | 5 | 6 | 7 |
| Construction of reinforcing layer | non-woven fabric + rubber composition | non-woven fabric + rubber composition | non-woven fabric + rubber composition | non-woven fabric + rubber composition | non-woven fabric + rubber composition | non-woven fabric + rubber composition (partial adhesion) | non-woven fabric + rubber composition (full peripheral adhesion) |
| Ratio of reinforcing layer to periphery length of toric air bag | 60% | 50% | 40% | 35% | 30% | 60% | 60% |
| Adhesion strength (kN/m) | 1.5 | 1.5 | 1.5 | 1.5 | 1.5 | 1.5 | 1.5 |
| Running endurance test (km) | complete run | complete run | complete run | complete run | complete run | complete run | complete run |
| Running endurance test under low pressure (index) | 140 | 135 | 130 | 120 | 110 | 140 | 140 |
| Insertion of small stone — endurance of toric reinforced air bag (index) | 850 | 780 | 720 | 550 | 480 | 850 | 780 |
| trouble form | rubbing | rubbing | rubbing | rubbing | formation of small hole | rubbing | rubbing |

| | Invention Tires | | | | | | |
|---|---|---|---|---|---|---|---|
| | 8 | 9 | 10 | 11 | 12 | 13 | 14 |
| Construction of reinforcing layer | non-woven fabric + rubber composition | non-woven fabric + rubber composition | non-woven fabric + rubber composition | non-woven fabric + rubber composition | non-woven fabric + rubber composition | non-woven fabric + rubber composition | non-woven fabric + rubber composition |
| Ratio of reinforcing layer to periphery length of toric air bag | 10% | 20% | 60% | 60% | 60% | 60% | 60% |
| Adhesion strength (kN/m) | 1.5 | 1.5 | 0.4 | 1 | 2 | 6 | 0 |
| Running endurance test (km) | trouble (100,000) | trouble (120,000) | complete run | complete run | complete run | complete run | complete run |
| Running endurance test under low pressure (index) | 105 | 105 | 135 | 140 | 140 | 120 | 130 |
| Insertion of small stone — endurance of toric reinforced air bag (index) | 300 | 350 | 500 | 850 | 850 | 400 | 500 |
| trouble form | formation of hole | formation of hole | formation of small hole | rubbing | rubbing | formation of hole | formation of small hole |

TABLE 1-2

|  | Comparative Tires | | |
|---|---|---|---|
|  | 1 | 2 | 3 |
| Construction of reinforcing layer | no reinforcing layer | joining of reinforcing layer through vulcanization | joining of reinforcing layer through vulcanization |
| Ratio of reinforcing layer to periphery length of toric air bag | 0 | 30% | 50% |
| Adhesive strength (kN/m) | — | 6 | 6 |
| Running endurance test (km) | trouble (70,000) | complete run | complete run |
| Running endurance test under low pressure (index) | 100 | 115 | 120 |
| Insertion of small stone — endurance of toric reinforced air bag (index) | 100 | 350 | 400 |
| trouble form | formation of hole | formation of hole | formation of hole |

Figure 1:
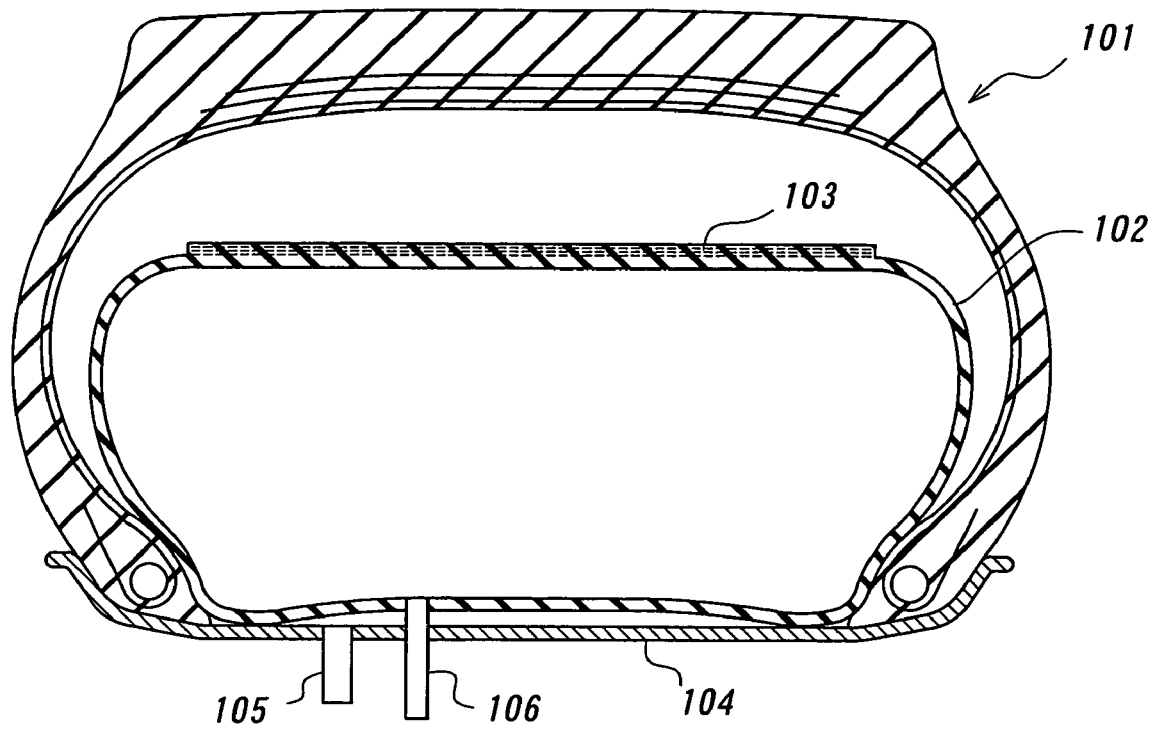
FIG. 1 is a widthwise section view of the conventional safety tire.

In Table 1, a comparative tire 1 has a structure shown in FIG. 1 except the removal of the reinforcing layer, while the reinforcing layer is joined to the toric air bag through vulcanization in comparative tires 2 and 3, respectively.

In Table 1 are also shown evaluation results on endurances of the tire and toric reinforced air bag when the same running endurance test under low pressure as mentioned above is conducted at a state of inserting five broken stone pieces into an interior of the tire.

As seen from Table 1, the running endurance and the running endurance under low pressure are improved in the invention tires as the width of the reinforcing layer becomes wider to the toric air bag. Also, the invention tires are excellent in the endurance of the toric reinforced air bag in the insertion of small stones as compared with the comparative tires 2 and 3 in which the reinforcing layer is joined to the toric air bag through vulcanization and can effectively prevent the breakage of the toric air bag.

Example 2

With respect to invention tires in which the structure of the reinforcing layer is variously changed and the ratio of the reinforcing layer to the periphery length of the toric air bag is 60% and the adhesion strength therebetween is 1.5 kN/m, the running endurance test and the running endurance test under low pressure are conducted under the same conditions as in Example 1 to obtain results as shown in Table 2.

Even in this case, the larger the index value, the better the result.

TABLE 2

|  |  | Invention Tires | | | | | | |
|---|---|---|---|---|---|---|---|---|
|  |  | 15 | 16 | 17 | 18 | 19 | 20 | 21 |
| Structure of reinforcing layer | width of strip (mm) | 40 | 40 | 5 | 30 | 40 | 50 | 80 |
|  | building direction | peripheral | peripheral | peripheral | peripheral | peripheral | peripheral | peripheral |
|  | overlap | ○ | ○ | ○ | ○ | ○ | ○ | ○ |
|  | side face contact | X | X | X | X | X | X | X |
|  | inclination angle width respect to peripheral direction (°) | 10 | 10 | 10 | 5 | 10 | 10 | 10 |
|  | strip length fibrous member | straight organic fiber cord | wavy organic fiber cord | wavy organic fiber cord | non-woven fabric | non-woven fabric | non-woven fabric | non-woven fabric |
| Running endurance test (km) |  | complete run | complete run | complete run | complete run | complete run | complete run | complete run |
| Running endurance test under low pressure (index) |  | 120 | 120 | 110 | 120 | 110 | 120 | 110 |
| Insertion of small stone | evaluation of toric reinforced air bag (index) | 850 | 850 | 790 | 970 | 970 | 970 | 910 |
|  | trouble form | rubbing | rubbing | formation of small hole | rubbing | formation of small hole | rubbing | rubbing |

|  |  | Invention Tires | | | | | | |
|---|---|---|---|---|---|---|---|---|
|  |  | 22 | 23 | 24 | 25 | 26 | 27 | 28 |
| Structure of reinforcing layer | width of strip (mm) | 40 | 40 | 40 | 40 | 40 | 40 | 5 |
|  | building direction | peripheral | peripheral | peripheral | peripheral | widthwise | widthwise | widthwise |
|  | overlap | ○ | ○ | ○ | X | ○ | ○ | ○ |
|  | side face contact | X | X | X | ○ | X | X | X |

TABLE 2-continued

|  |  |  |  |  |  |  |  |
|---|---|---|---|---|---|---|---|
|  | inclination angle width respect to peripheral direction (°) | 5 | 30 | 50 | 5 | 80 | 80 | 80 |
|  | strip length fibrous member | continuous non-woven fabric fiber cord | continuous non-woven fabric fiber cord | continuous non-woven fabric | non-woven fabric | straight organic | wavy organic | non-woven fabric |
| Running endurance test (km) |  | complete run | complete run | complete run | complete run | complete run | complete run | complete run |
| Running endurance test under low pressure (index) |  | 120 | 120 | 120 | 110 | 120 | 120 | 110 |
| Insertion of small stone | evaluation of toric reinforced air bag (index) | 970 | 910 | 790 | 850 | 850 | 850 | 790 |
|  | trouble form | rubbing | rubbing | rubbing | formation of hole | rubbing | rubbing | formation of small hole |

|  |  | Invention Tires |  |  |  |  |  |
|---|---|---|---|---|---|---|---|
|  |  | 29 | 30 | 31 | 32 | 33 | Comparative Tire 4 |
| Structure of reinforcing layer | width of strip (mm) | 30 | 40 | 50 | 80 | 40 | formation of shaped body for reinforcing layer by winding single composite material on hard support |
|  | building direction | widthwise | widthwise | widthwise | widthwise | widthwise |  |
|  | overlap | ○ | ○ | ○ | ○ | X |  |
|  | side face contact | X | X | X | X | ○ |  |
|  | inclination angle width respect to peripheral direction(°) | 80 | 80 | 80 | 80 | 80 |  |
|  | strip length fibrous member | continuous non-woven fabric | continuous non-woven fabric | continuous non-woven fabric | continuous non-woven fabric | short non-woven fabric | non-woven fabric |
| Running endurance test (km) |  | complete run | complete run | complete run | complete run | complete run | trouble |
| Running endurance test under low pressure (index) |  | 120 | 110 | 120 | 110 | 105 | 100 |
| Insertion of small stone | Evaluation of toric reinforced air bag (index) | 970 | 910 | 970 | 910 | 850 | 100 |
|  | trouble form | rubbing | formation of small hole | rubbing | rubbing | formation of hole | formation of hole |

A comparative tire 4 in the above table is constructed by winding one composite material using a non-woven fabric as a fibrous member on a hard support in its peripheral direction one times to form a shaped body for the reinforcing layer. Therefore, the shaped body and hence the reinforcing layer has one joint line on its periphery.

As seen from Table 2, the invention tires 15–25 each formed by building strips in the peripheral direction can develop excellent running endurance and running endurance under low pressure irrespectively of the strip width or irrespectively of the presence or absence of the overlapped portion. Also, since the fibrous member is the non-woven fabric, the endurance of the toric reinforced air bag in the insertion of the small stones can be improved as compared with the case of using the organic fiber cords as the fibrous member.

Moreover, when the angle of the strip is 50° with respect to the peripheral direction, the deterioration of the endurance of the toric reinforced air bag in the insertion of small stones is not avoided.

Further, it is understood that the endurance of the toric air bag in the insertion of small stones is tendentiously improved even in the invention tires 26–33, in which the strips using the non-woven fabric as the fibrous member are built in the widthwise direction and particularly the width of the strip is 30–80 mm as compared with the case of using the organic fiber cord as the fibrous member.

Example 3

In the invention methods of forming the shaped body for the reinforcing layer by winding and building narrow-width strip of the composite material of fibrous member and rubber or the like onto a ring-shaped hard support as shown in FIGS. 12 and 13, a time requiring the formation of the shaped body for the reinforcing layer and the presence or absence of wrinkles in the shaped body are examined, and the tests for endurances in usual running and running under low pressure of the safety tire using the toric air bag provided with the cured product of the shaped body for the reinforcing layer are conducted to obtain results as shown in Table 3.

Moreover, three additional reinforcing layers outside the crown portion shown in FIG. 12 are properly arranged for the purpose of ensuring the desired rigidity balance and may be formed by spirally winding the narrow-width strip or winding a wide-width sheet in accordance with the selection of the layer number.

In the table, a conventional example is a case having a structure of FIG. 1 formed by forming the shaped body for the reinforcing layer on the toric air bag of an expansion posture, and a comparative example is a case of using the toric air bag having no shaped body for the reinforcing layer.

Also, the numerical values in the table are index values, in which the smaller the value on the forming time and the larger the value on the running endurance under low pressure, the better the result.

FIGS. 9, 10 and 11, a time requiring for the formation of the shaped body for the reinforcing layer and a reject ratio of the shaped body for the reinforcing layer as a product are examined to obtain results as shown in Table 4.

TABLE 3

| | | Invention Method 1 | Invention Method 2 | Invention Method 3 | Invention Method 4 | Invention Method 5 | Invention Method 6 | Invention Method 7 | Conventional Example | Comparative Example |
|---|---|---|---|---|---|---|---|---|---|---|
| Figure | | FIG. 12 | FIG. 12 | FIG. 12 | FIG. 12 | FIG. 12 | FIG. 13 | FIG. 12 | — | — |
| Arrangement of composite body | crown portion | 4 (layer) | 3 (layer) | 3 (layer) | 4 (layer) | 4 (layer) | 4 (layer) | 4 (layer) | 4 | — |
| | side portion | 1 (layer) | 1 (layer) | 2 (layer) | 1 (layer) | 1 (layer) | 1 (layer) | 1 (layer) | 1 | — |
| | base portion | 4 (layer) | 2 (layer) | 3 (layer) | 4 (layer) | 6 (layer) | 4 (layer) | 3 (layer) | 3 | — |
| | width of strip (mm) | 40 | 50 | 40 | 80 | 40 | 40 | 40 | | — |
| | winding method | overlap | overlap | overlap | overlap | overlap | overlap | side face contact | direct application to toric air bag | — |
| Forming time (index) | | 20 | 10 | 20 | 20 | 30 | 20 | 20 | 100 | — |
| Occurrence of wrinkle | | absence | absence | absence | presence | absence | absence | absence | many occurrence | — |
| Endurance | usual running | complete run | complete run | complete run | complete run | complete run | complete run | complete run | complete run | trouble |
| | running under low pressure (index) | 800 | 400 | 600 | 800 | 900 | 800 | 750 | 300 | 100 |

In this example, the composite material is a composite body of non-woven fabric and rubber, and the toric air bag is made of a soft rubber for tire tube.

Moreover, the above endurance test is carried out by assembling the tire having a tire size of 315/60R22.5 onto a rim having a rim width of 9.00 inches.

The endurance in the usual running is evaluated by measuring whether or not the tire can be run at a speed of 60 km/h over 150,000 km under an internal tire pressure of 900 kPa, an internal pressure of toric air bag of 950 kPa and a load of 34.8 kN.

The endurance in the running under low pressure is evaluated by measuring a running distance until the load support by the toric air bag is lost under the aforementioned load and speed conditions on the assumption that the tire is punctured and the internal tire pressure is rendered into atmospheric pressure and the internal pressure of the toric air bag ins rendered into 450 kPa.

As seen from Table 3, all the invention methods can form the reinforcing layer in a very short time, while the safety tires using the cured products of such shaped bodies for the reinforcing layer can develop higher endurance in both of the usual running and the running under low pressure.

Example 4

With respect to the invention methods 8, 9 and 10 according to the building of narrow-width strips shown in Moreover, a conventional method in the table is a case of forming the shaped body for the reinforcing layer on the toric air bag of an expansion posture likewise the case of Example 3.

Also, the numerical values in the table are represented by an index on the basis that the conventional method is control, in which the smaller than index value the better the result.

TABLE 4

| | Invention Method 8 | Invention Method 9 | Invention Method 10 | Conventional Method |
|---|---|---|---|---|
| Strip building embodiment | FIG. 9 | FIG. 10 | FIG. 11 | — |
| Fibrous member in composite body | non-woven fabric | non-woven fabric | non-woven fabric | non-woven fabric |
| Forming time (index) | 10 | 15 | 50 | 100 |
| Reject ratio (index) | 20 | 20 | 40 | 100 |

As seen from Table 4, according to the invention methods, all of the forming time and the reject ratio can be made to not more than a half of those in the conventional method. Particularly, in the invention method 9, the forming time can be reduced to about 1/10 and the rejection ratio can be reduced to about 1/5.

INDUSTRIAL APPLICABILITY

In the toric reinforced air bag according to the invention, even if cracks or other damages are caused in the reinforcing layer, the propagation to the toric air bag cab be effectively prevented to largely improve the running endurance when the load support is subrogated by the toric reinforced air bag. According to the method of producing the toric reinforced air bag according to the invention, the desired reinforcing layer is produced simply and rapidly and can be accurately fitted onto the required position of the toric air bag, whereby the function of controlling the size growth and the function of stretching in the peripheral direction inherent to the reinforcing layer itself can be sufficiently properly developed, respectively.

Further, according to the method of producing the shaped body for the reinforcing layer according to the invention, the shaped body for the reinforcing layer is formed by building the strips onto the hard support having the required constant cross-sectional outer profile form, whereby the shaped body for the reinforcing layer having the desired shape and size and capable of always and properly fitting onto the given position of the toric air bag can be produced simply, easily and efficiently.

The invention claimed is:

1. A toric reinforced air bag having a hollow torus shape and adapted to be placed inside a safety tire and when inflated under a certain internal pressure and expansion-deformed accompanied with the drop of the internal tire pressure subrogates a load support from the tire, wherein the air bag has a hollow torus shape and a crown portion extending around a periphery thereof, wherein a reinforcing layer which is distinct from the air bag is fitted on and affixed to an outer peripheral side of the crown portion over a full periphery thereof, and wherein the reinforcing layer has a seamless structure on its periphery such that there are no seams extending across an entire width of the reinforcing layer.

2. A toric reinforced air bag according to claim 1, wherein the reinforcing layer is fitted onto the toric air bag over a range of not less than ⅓ of a periphery length at a cross section thereof.

3. A toric reinforced air bag for a safety tire according to claim 1, wherein the reinforcing layer is affixed by adhesion to the toric air bag.

* * * * *